US008798926B2

(12) United States Patent
Stroila et al.

(10) Patent No.: US 8,798,926 B2
(45) Date of Patent: Aug. 5, 2014

(54) AUTOMATIC IMAGE CAPTURE

(71) Applicant: Navteq B.V., Veldhoven (NL)

(72) Inventors: Matei Nicolae Stroila, Chicago, IL (US); Ole Henry Dorum, Chicago, IL (US)

(73) Assignee: Navteq B.V., Veldhoven (NL)

( * ) Notice: Subject to any disclaimer, the term of this patent is extended or adjusted under 35 U.S.C. 154(b) by 0 days.

(21) Appl. No.: 13/676,662

(22) Filed: Nov. 14, 2012

(65) Prior Publication Data

US 2014/0136098 A1 May 15, 2014

(51) Int. Cl.
*G01S 5/00* (2006.01)
*G01C 11/04* (2006.01)

(52) U.S. Cl.
CPC ............... *G01C 11/04* (2013.01); *G01S 5/0027* (2013.01)
USPC ............ 701/516; 701/517; 701/451; 701/537

(58) Field of Classification Search
USPC .......................... 701/409, 451, 516, 517, 537
See application file for complete search history.

(56) References Cited

U.S. PATENT DOCUMENTS

| | | | | |
|---|---|---|---|---|
| 6,400,956 | B1 * | 6/2002 | Richton | 455/456.3 |
| 7,499,586 | B2 * | 3/2009 | Agarwala et al. | 382/154 |
| 7,554,539 | B2 * | 6/2009 | Balfour | 345/419 |
| 7,986,339 | B2 * | 7/2011 | Higgins | 348/149 |
| 8,326,048 | B2 * | 12/2012 | Ofek et al. | 701/412 |
| 8,509,488 | B1 * | 8/2013 | Enge et al. | 382/106 |
| 2002/0093435 | A1 * | 7/2002 | Baron | 340/995 |
| 2005/0122405 | A1 * | 6/2005 | Voss et al. | 348/211.2 |
| 2006/0244830 | A1 * | 11/2006 | Davenport et al. | 348/148 |
| 2009/0086015 | A1 * | 4/2009 | Larsen et al. | 348/46 |
| 2009/0319348 | A1 * | 12/2009 | Khosravy et al. | 701/201 |
| 2012/0086825 | A1 | 4/2012 | Yost et al. | |
| 2012/0130762 | A1 * | 5/2012 | Gale et al. | 705/7.13 |

(Continued)

FOREIGN PATENT DOCUMENTS

| | | |
|---|---|---|
| EP | 2442291 A1 | 4/2012 |
| JP | 11160080 | 6/1999 |

(Continued)

OTHER PUBLICATIONS

International Search Report and Written Opinion cited in PCT/UP2013/073225, mailed Feb. 2, 2014.
Ignas Budvytis et al., "Compass-Based Automatic Picture Taking using SenseCam", Microsoft Research Cambridge, accessed Nov. 1, 2012.

*Primary Examiner* — Helal A Algahaim
*Assistant Examiner* — Dale W Hilgendorf
(74) *Attorney, Agent, or Firm* — Lempia Summerfield Katz LLC

(57) ABSTRACT

In one embodiment, a mobile device generates sensor data configured to describe a geographic position of a mobile device. A list of events is defined according to position data and time data. The geographic position of the mobile device is compared to positions in the list of events of interest and a current time is compared to time data in the list of events of interest. The comparison determines whether events in the list are in range of the mobile device. One or more nearby events in range of the mobile device at the current time or a future time are selected. A command is generated to capture an image of the nearby events using a camera coupled to the mobile device. The captured images may be used to update navigation or map database, provide community or weather data to other users, social media functions, or other features.

20 Claims, 11 Drawing Sheets

(56) References Cited

U.S. PATENT DOCUMENTS

2012/0162258 A1* 6/2012 Kim et al. .................... 345/633
2012/0212405 A1* 8/2012 Newhouse et al. ........... 345/156
2013/0013091 A1* 1/2013 Cavalcanti et al. ............ 700/90
2013/0114849 A1* 5/2013 Pengelly et al. .............. 382/103

FOREIGN PATENT DOCUMENTS

| JP | 2003123190 | 4/2003 |
| JP | 2006084461 | 3/2006 |
| JP | 2007093291 | 4/2007 |

* cited by examiner

AUTOMATIC IMAGE CAPTURE

FIELD

The following disclosure relates to photo capture in navigation-related applications.

BACKGROUND

Navigation systems are provided on various different computer platforms. For example, a navigation system can be a standalone system or a networked system. In a standalone navigation system, the software applications, geographic data, and hardware are combined at a single location. A standalone system may be installed in a vehicle or carried by a person. In a networked navigation system, some of the software or geographic data are located with the hardware with the user and some of the software or geographic data are located remotely and accessed over a communications system. A navigation system can be implemented on a dedicated platform in which the hardware and software are specifically designed for navigation purposes. Alternatively, a navigation system can be implemented on a general purpose computing platform (such as a personal computer, personal digital assistant, smart phone, or a networked computer) using appropriate navigation-related software applications and data.

Navigation systems (including general purpose computing platforms that run navigation applications) provide a variety of useful features and services. For example, navigation systems used in vehicles can provide detailed instructions for driving to desired destinations, thereby reducing travel times and expenses. Navigation systems and navigation applications can also search for businesses of a desired type and provide routing guidance to locations of such businesses.

One consideration associated with navigation systems and applications is that geographic data used by the navigation systems become out-of-date. For example, new roads are built, businesses change locations, road construction closes roads, detours are established, museum and restaurant hours change, etc. It is expected that end users, such as vehicle owners who have navigation systems in their vehicles, will want to have the geographic data in their navigation systems updated from time to time.

The collection of geographic data for use in navigation systems may be a significant undertaking. For example, the initial collection of data about the roads, destinations, and points of interest in a geographic area may be time consuming. Also, geographic data used in navigation systems may become out-of-date. There also may be errors in collected geographic data. Updating and checking the geographic data may involve significant efforts. Therefore, providing up-to-date and accurate geographic data is a continuing, burdensome effort.

SUMMARY

In one embodiment, a mobile device generates sensor data configured to describe a geographic position of a mobile device. A list of events is defined according to position data and time data. The geographic position of the mobile device is compared to positions in the list of events of interest and a current time is compared to time data in the list of events of interest. The comparison determines whether events in the list are in range of the mobile device. One or more nearby events in range of the mobile device at the current time or a future time are selected. A command is generated to capture an image of the nearby events using a camera coupled to the mobile device. The captured images may be used to update a navigation or map database, provide community or weather data to other users, social media functions, or other features.

BRIEF DESCRIPTION OF THE DRAWINGS

Exemplary embodiments of the present invention are described herein with reference to the following drawings.

DETAILED DESCRIPTION

The following embodiments include an automatic photo capture for a camera in a mobile device. Rather than continuously collecting image data, images are captured only when needed. A list of events may be used to trigger the automatic photo capture. The photo capture may be triggered when a frustum or field of view of the camera in the mobile device intersects an expected location and time of an event. The collected images may be used to update a map database, provide location based features to a user of the mobile device, collect data from groups of users, or other features.

The list of events includes geographic positions and/or time ranges. This list may include a geospatio-temporal event, which includes a geographic component and a time component. The list of events may be tied to a calendar event such as an opening of a business or a concert. The list of events may include locations where a building or other point of interest has recently been removed or built. The list of events may include information collected from a social networking site. The list of events may include locations and time of possible traffic problems or road construction.

The events may be presently occurring or occur in the future. The image may be of the results of an event, such as a building built days, weeks, or months in the past. The event may be the construction of the building or the existence of the building. The image for the event may thus be of the results of the event or the ongoing occurrence of the event. The event list may include baseline events, such as the state of a location at a time prior to an expected change.

As the mobile device is moved around a geographic area, a position circuit detects a current location and generates data indicative of the current location. The current location may include one or more of longitude, latitude, and elevation. The current location may include or be combined with orientation (e.g., roll, pitch, and/or yaw) and heading. The current location and a current time, or a predicted location at a future time, is compared to the list of events. If one of the events of interest is nearby, the mobile device automatically triggers an image capture using the camera.

The comparison of locations and times of the mobile device to the list of events may include calculating an intersection of the field of view of the camera and a nearby event. The intersection may be compared to a threshold level of overlap. The threshold level of overlap may be a percentage of the object of interest described by the list of events. The threshold level of overlap may be a percentage of the field of view encompassed by the object of interest described by the list of events.

Figure 1:
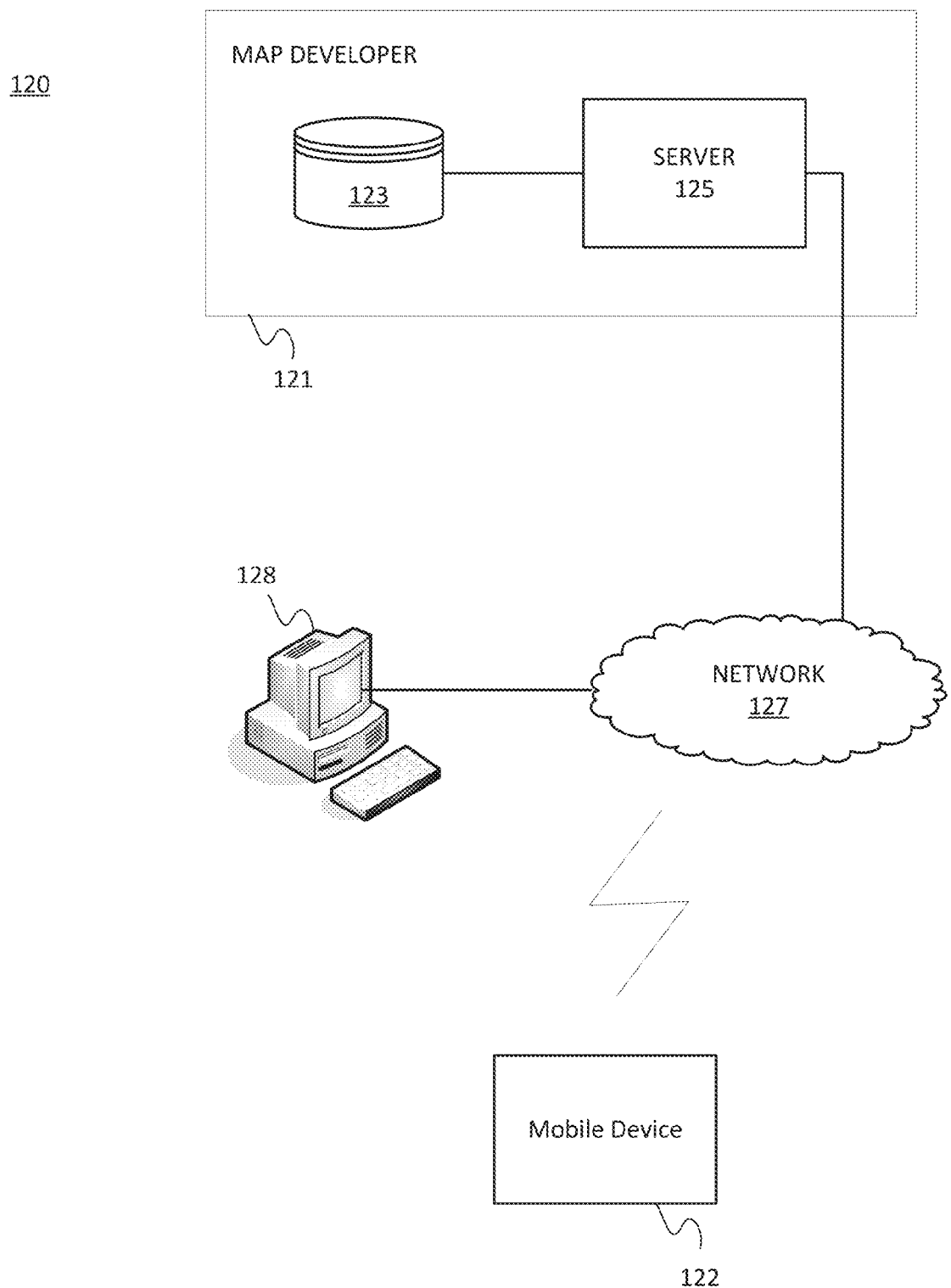
FIG. 1 illustrates an exemplary navigation system.

FIG. 1 illustrates an exemplary navigation system 120. The navigation system 120 includes a map developer system 121, a mobile device 122, a workstation 128, and a network 127. Additional, different, or fewer components may be provided. For example, many mobile devices 122 and/or workstations 128 connect with the network 127.

The developer system 121 includes a server 125 and a database 123. The optional workstation 128 is a general purpose computer including programming specialized for the following embodiments. The workstation 128 includes at least a memory, a processor, and a communication interface. The developer system 121 may include computer systems and networks of a system operator (e.g., NAVTEQ or Nokia Corp.).

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

The mobile device 122 is a smart phone, a mobile phone, a personal digital assistant ("PDA"), a tablet computer, a notebook computer, a personal navigation device ("PND"), a portable navigation device, and/or any other known or later developed portable or mobile device including an imager or camera. The mobile device 122 includes one or more detectors or sensors as a positioning system built or embedded into or within the interior of the mobile device 122. Alternatively, the mobile device 122 uses communications signals for position determination. The mobile device 122 receives location data from the positioning system. The server 125 may receive sensor data configured to describe to a position of a mobile device, or a controller of the mobile device 122 may receive the sensor data from the positioning system of the mobile device 122.

The mobile device 122 may be mounted in a vehicle. The mobile device 122 may be mounted to a windshield or window of a motor vehicle. A field of view of the camera of the mobile device 122 may be impacted by the windshield or window and/or the angle and mounting technique. The mobile device 122 could be mounted on a non-motorized vehicle such as a bicycle. The mobile device 122 may be handheld or statically mounted on a person. In one embodiment, the mobile device 122 is separated into a camera portion and a positioning portion. The camera portion is mounted (or built-in) to the vehicle (e.g., on the front bumper, rear bumper, or the roof). The positioning portion is a navigation device incorporated into a console or computer of the vehicle.

Either the mobile device 122 or the database 123 stores a list of events. Examples of events in the list of events include open ended events, periodic events, and single events. Open ended events are events that begin at a specific time and continue indefinitely or for a significant period of time. Examples of open ended events include a newly constructed object (e.g., building, monument), or a recently razed or altered object. Open ended events may include any new point of interest. Entries in the list of events for open ended events may include a start time, a stop time, and/or a start time and duration. Example start times include a time of day, a day of the week, a month, or a year.

Periodic events occur repeatedly according to a schedule. Examples of periodic events include the hours of a new business (e.g., 9:00 AM to 5:00 PM, Monday through Friday), a series of a show or performance (e.g., 10:00 PM to 12:00 AM, Thursday through Saturday), or daily rush hour (e.g., 7:00 AM-9:00 AM, Monday through Friday, excluding holidays).

Single events occur at a start time and continue for an amount of time. Single events may be planned ahead of time or unplanned. Planned single events include a concert or a construction site. For unplanned single events, data indicative of the start time may be received from another device. Examples of unplanned single events include a weather pattern, traffic conditions, or criminal activity. Both planned and unplanned single events may be received from a social networking service. For example, the social networking service may generate and deliver messages to the mobile device 122 that describe planned calendar events (e.g., party invitations, birthdays, reunions). The social networking service may generate and deliver messages to the mobile device 122 that describe unplanned events such as a friend's location, a tagged location, a check-in location, or other locations. The location may be automatically detected by the social networking service by a mobile device of the friend or the location may be manually entered by the friend or another user.

The list of events of interest is accessed from a memory. The mobile device identifies at least one time component and at least one geographic position from the list of events of interest. The mobile device 122 compares the geographic position of the mobile device, as determined by the positioning system, to positions in the list of events of interest. The mobile device 122 compares a current time to times in the list of events of interest. The mobile device 122 is configured to select a nearby event from the list of events of interest in range of the mobile device at the current time. The mobile device 122 is configured to generate a command to instruct a camera to capture an image of the nearby event.

The captured image may be stored in mobile device 122 and/or sent to the server 125. In one implementation, the captured image may be used to update a navigational database, which may be included in the database 123. For example, the captured image may be added to a street side set of images or a panoramic image. The list of events may be generated by the map developer to specify specific locations where navigation or map data is needed. For example, the list of events may include reported new construction sites. The list of events may be generated from a list of new addresses in an area. Optionally, the captured image may be presented to a database administrator for identification of the object of interest in the captured image. The identification of the object may be added to a point of interest database.

The captured images may be accessed according to a route calculation algorithm or a map algorithm, which may be executed by either the mobile device 122 or the server 125. The geographic database 123 may be used for navigation related features. The route calculation algorithm allows end users to access a route from an origin to a destination based on current position data. The map algorithm is a type of route calculation algorithm that allows end users to access a route from any two points. The route calculation application determines the route for the end user to travel along the road segments to reach the desired destination. In order to calculate a route, the route calculation application is provided with data identifying a starting location (origin) and a desired destination location. In one embodiment, the starting location may be the end user's current position and the destination may be entered by the end user. Given at least the identification of the starting location (origin) and the desired destination location, the route calculation application determines one or more solution routes between the starting location and the destination location. A solution route is formed of a series of connected road segments over which the end user can travel from the starting location to the destination location. When the route calculation application calculates a route, the application accesses the geographic database 123 and obtains data that represent road segments around and between the starting location and the destination location. The road calculation application uses the data to determine at least one valid solution route from the starting location to the destination location.

The at least one valid solution route may be displayed to the user in the rendering of the geographic region such that addresses or points of interest along the route may be selected to display textually, or graphically as street side imagery, which may be supplemented by the captured image. Further, an image that corresponds to the destination location, origin location, or any points of interest along the route may be extracted from the captured image and displayed to the user in the rendering of the geographic region.

The route calculation application may attempt to find a solution route that takes the least time to travel. The segment cost or travel time for the particular represented road segment considers the type of road, such as freeway or residential street, speed limit and distance of the segment. In one embodiment, the route calculation application may consider traffic conditions or weather conditions to more accurately reflect actual travel time over the connected road segments. The traffic conditions or weather conditions may be determined from the captured image by inspection of the image or by image analysis.

When the route calculation application determines one or more solution routes comprising the series of connected road segments, the travel times for each of the included connected road segments is summed to provide an estimated route travel time. Based on the route travel time, the route calculation application selects the quickest route. Once the route calculation application has selected the route, the route calculation application provides an output in the form of an ordered list identifying a plurality of road segments that form the continuous navigable route between the origin and the destination. In addition, the route calculation program provides an output of an estimated route travel time. The captured image may be used to provide a weather report, a traffic report, or a construction report to users. For example, the captured image may be combined with the location of the image and associated with a route.

Figure 2A:
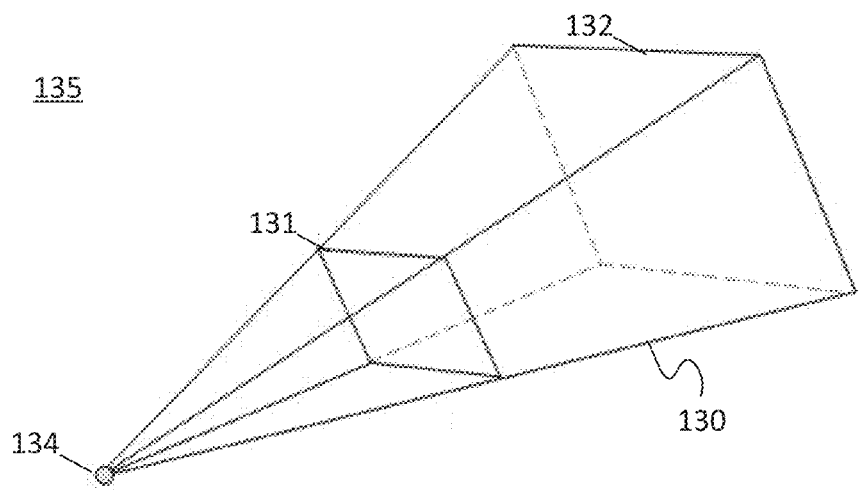
FIG. 2A illustrates a three-dimensional frustum of the camera of the mobile device.
Figure 2B:
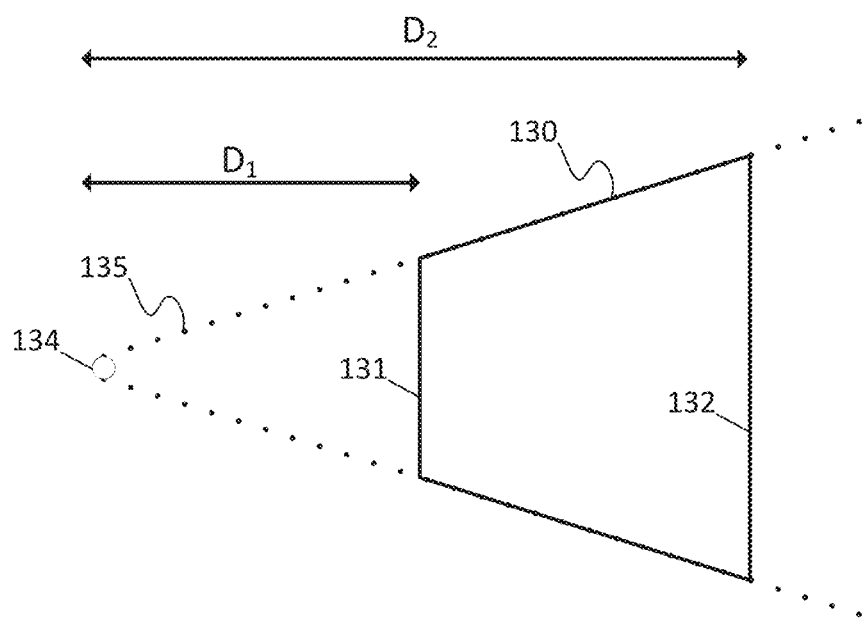
FIG. 2B illustrates a two-dimensional frustum of the camera of the mobile device.

FIG. 2A illustrates a three-dimensional view of a frustum 130 of the camera of the mobile device 122. The frustum 130 is the view that the camera can image at any given position. A point 134 is the center of the camera or a lens location of the camera that defines the frustum 130. The frustum 130 shown in FIGS. 2A and 2B is a clipped pyramid. The frustum 130 may be a solid that lies between two substantially parallel planes intersecting the solid such as near plane 131 and far plane 132. FIG. 2A illustrates an example where frustum 130 is a pyramidal frustum. The frustum 130 may also be a conical frustum with circular bases or another solid with polygon bases. The frustum 130 may be irregularly shaped.

FIG. 2B illustrates a two-dimensional view of the frustum 130 of the camera of the mobile device 122. In one example, two-dimensional locations for the mobile device 123 and a two-dimensional frustum may be used. The two-dimensional frustum may be a projection of the frustum 130 on the surface of the ground. The determination of the intersection of the frustum and the object of interest may be simplified to a single plane parallel to the surface of the ground. That is, differences in distance between higher elevation points on the object and point 134 may be ignored. The determination of the intersection of the frustum may assume all objects between $D_1$, a distance from the point 134 to the near plane 131, and $D_2$, a distance from the point 134 to the far plane 132, fall within the viewable range of the camera irrespective of elevation.

The frustum 130 spans a geographic area. The geographic area is bounded by two planes representing the closest distance and farthest distance that the camera can properly image. The frustum 130 may be represented in various ways. For example, a three-dimensional frustum 130 may be precisely described by eight points in a three-dimensional space. In another example, a three-dimensional frustum may be estimated by four points defining the near plane 131 and a viewing distance to the far plane 132. This example may estimate the far plane 132 as having the same area as the near plane 131. In another example, a three-dimensional frustum may be estimated by four points defining the far plane 132 and a viewing distance to the near plane 131. This example may estimate the near plane 131 as having the same area as the far plane 132. Alternatively, the frustum may be estimated as a plane extending indefinitely direction, which may be defined by three points in the plane. In addition, the plane may be assumed to be vertical, in which case only two points are needed to define the plane of the frustum.

Alternatively, the frustum 130 may be represented by field of view angles. In the case of a three-dimensional frustum, the frustum 130 may be defined by a horizontal field of view angle and a vertical field of view angle. In the case of a two-dimensional frustum, the frustum 130 may be defined by only a horizontal field of view angle. In either example, the frustum 130 may be further defined by a focal length, a distance $D_1$ to the near plane 131, a distance $D_2$ to the far plane 132, or any combination of these distances. In another example, the frustum 130 as a conical frustum may be defined by a vector of the viewing direction of the camera and a radius. The vector may be calculated according to the orientation and the heading of the camera. Other representations are possible.

Figure 3:
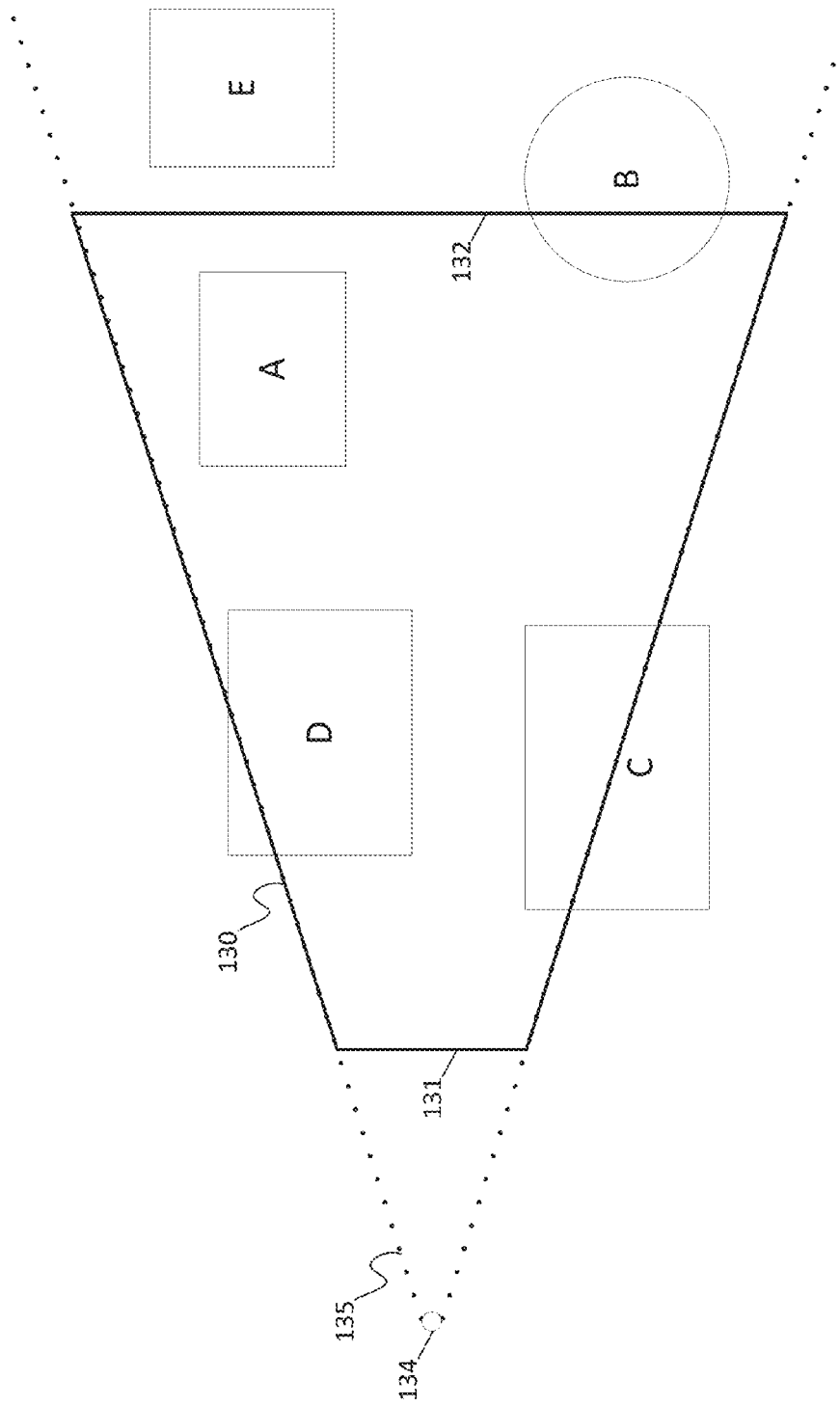
FIG. 3 illustrates an example frustum of FIG. 2A or 2B intersected with objects of interest.

FIG. 3 illustrates an example frustum 130 overlapping with objects of interest A-E. The objects of interest may be two-dimensional areas or three-dimensional volumes. The overlap may be calculated in two-dimensions or three-dimensions. The objects may be defined by shapes as shown in FIG. 3 or a representative outline or grid of points.

A set of points defining the objects of interest A-E are compared to a set of points describe the frustum 130. A threshold level of overlap defines when the overlap of the object of interest of frustum 130 is significant enough to trigger image capture. Example thresholds include a percentage of overlap (e.g., 10%, 30%, 70%, 90%, 100%). As an illustration, if the threshold is 70%, objects A and D in FIG. 3 may be considered matches with the current geographic position of the frustum 130 at the current time. If the threshold is 30%, objects, A, C, and D may be considered matches with the current geographic position of the frustum 130 at the current time. If the threshold is 100%, object A may be considered a match with the current geographic position of the frustum 130 at the current time.

In one implementation, rather than a percentage overlap, an actual area of overlap may be used. For example, the actual areas of the frustum 130 and the objects of interest are calculated. If an area of the overlap of the frustum 130 and the objects of interest exceeds a threshold area, an image is captured. Example threshold areas include 10 m$^2$, 20 m$^2$, or 50 m$^2$. A volume of overlap may instead be used. Other methods for determining overlap are possible.

Figure 4:
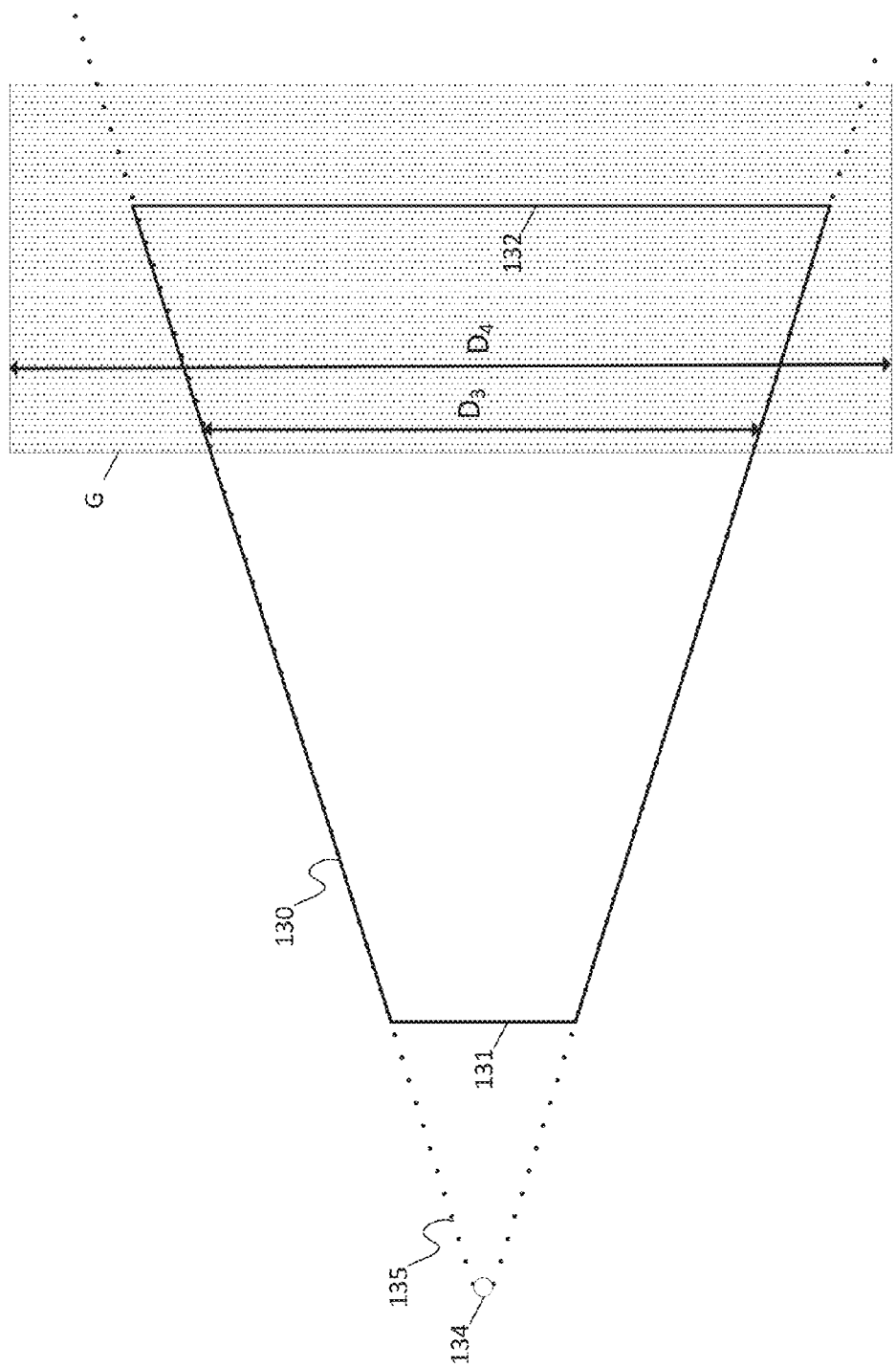
FIG. 4 illustrates an example frustum of FIG. 2A or 2B intersected with an object of interest.

FIG. 4 illustrates an example frustum of FIG. 2A or 2B intersected with an object of interest G. A set of points defining the objects of interest G is compared to a set of points describing the frustum 130. The implementation of FIG. 4 includes a threshold level of overlap defined by how much of the frustum 130 overlaps with the object of interest. When the overlap of the frustum 130 with the object of interest is above the threshold, a trigger is generated to cause the mobile device to capture an image of the area of the frustum 130. Example thresholds include a percentage of overlap (e.g., 10%, 30%, 70%, 90%, 100%). The example object of interest G shown in FIG. 4 is large enough to completely overlap the frustum 130.

The comparison of the frustum 130 to the object of interest may be made in two or three dimensions as described above. Alternatively, the comparison of the frustum 130 to the object of interest may be made in one dimension by comparing a width of the frustum 130 with a length of the overlapping portion of the object of interest G at a certain depth. The depth may be at the near plane 131 or at the far plane 132. The depth may be at a predetermined position between the near plane 131 and the far plane 131. The predetermined distance may be halfway between the near plane 131 and the far plane 132. The example in FIG. 4 illustrates a comparison made at a distance about ⅔ the way to the far plane 132.

Figure 5:
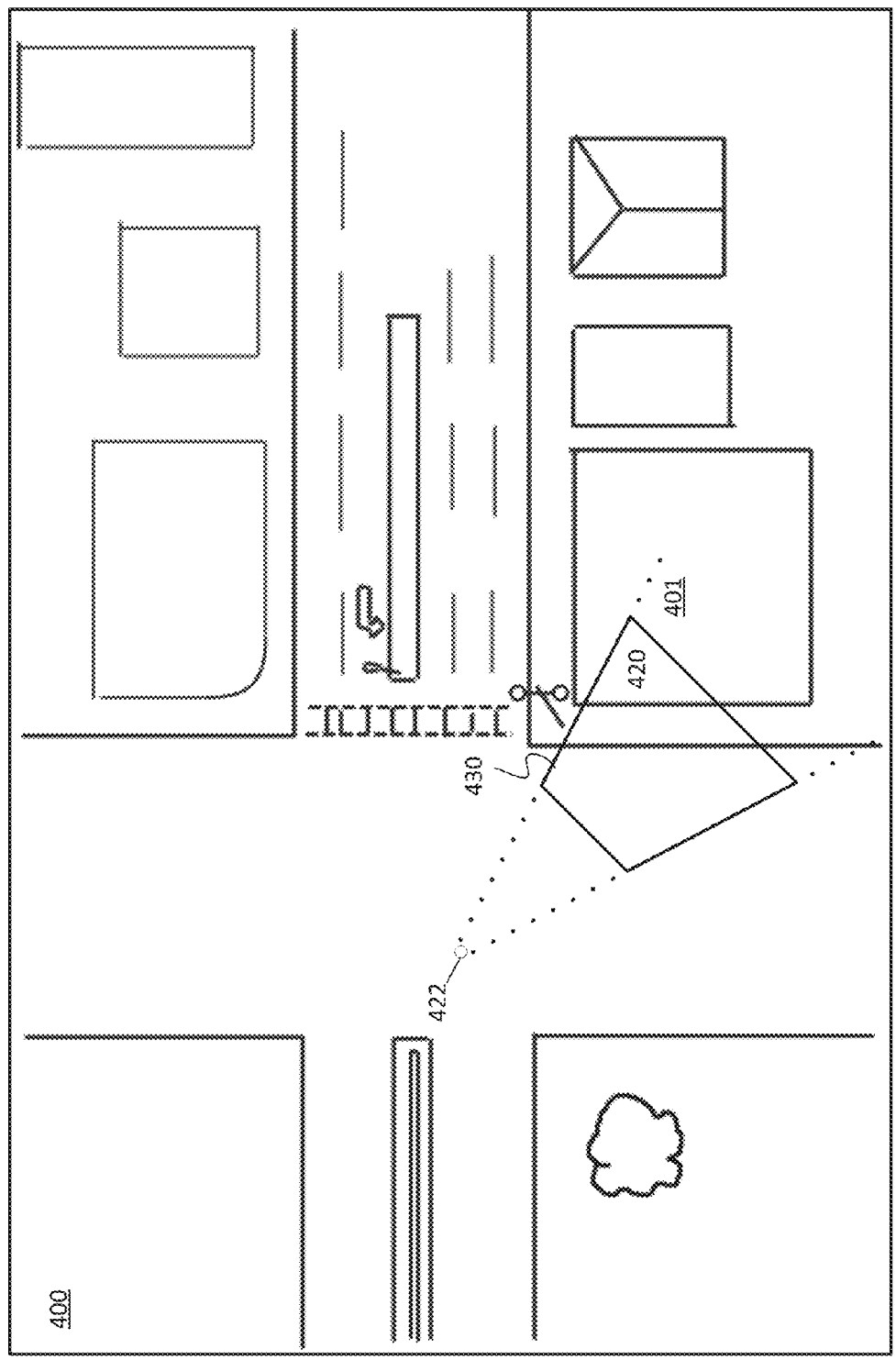
FIG. 5 illustrates an example frustum on a street setting.
Figure 6:
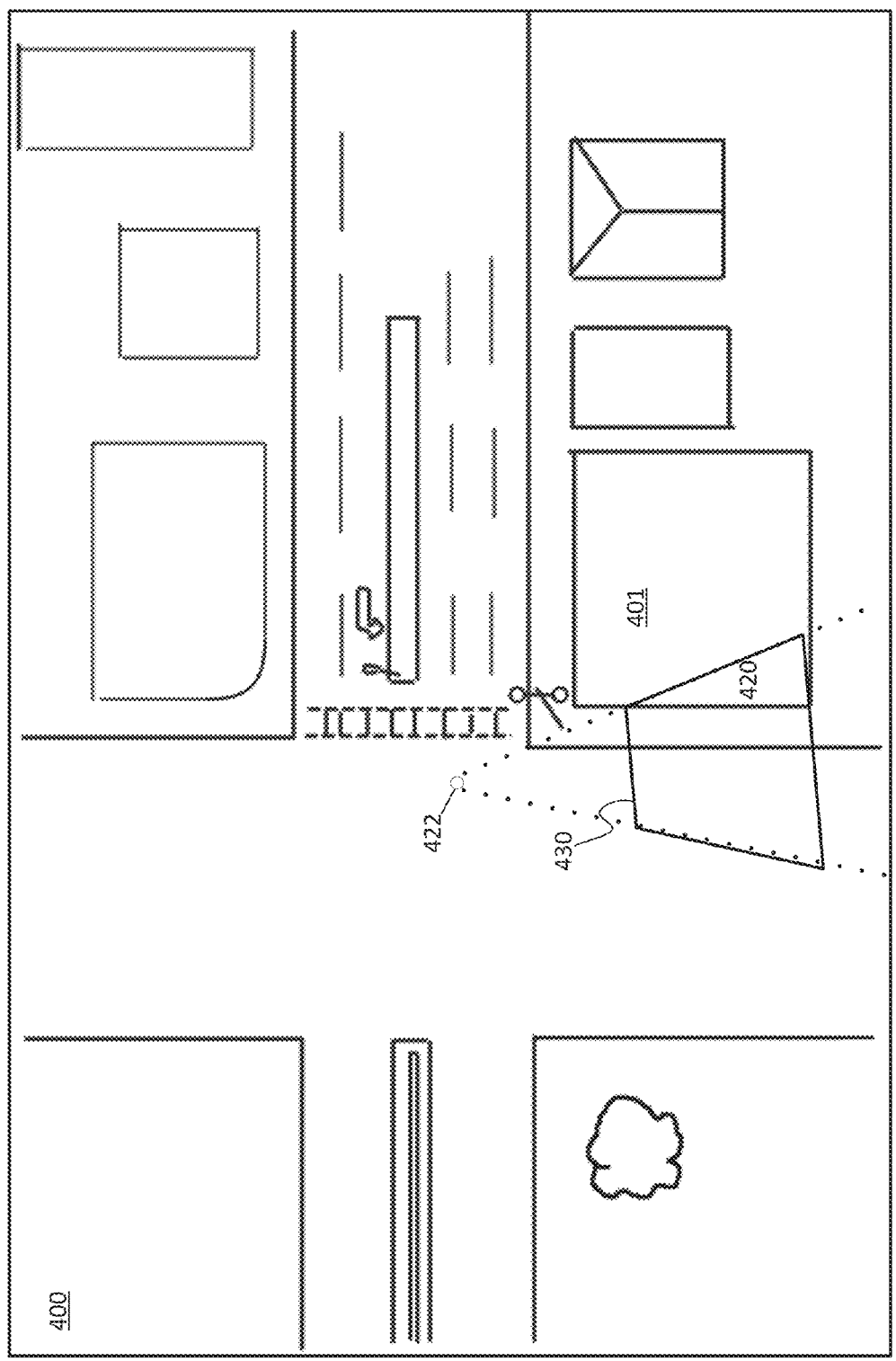
FIG. 6 illustrates another example frustum on a street setting.
Figure 7:
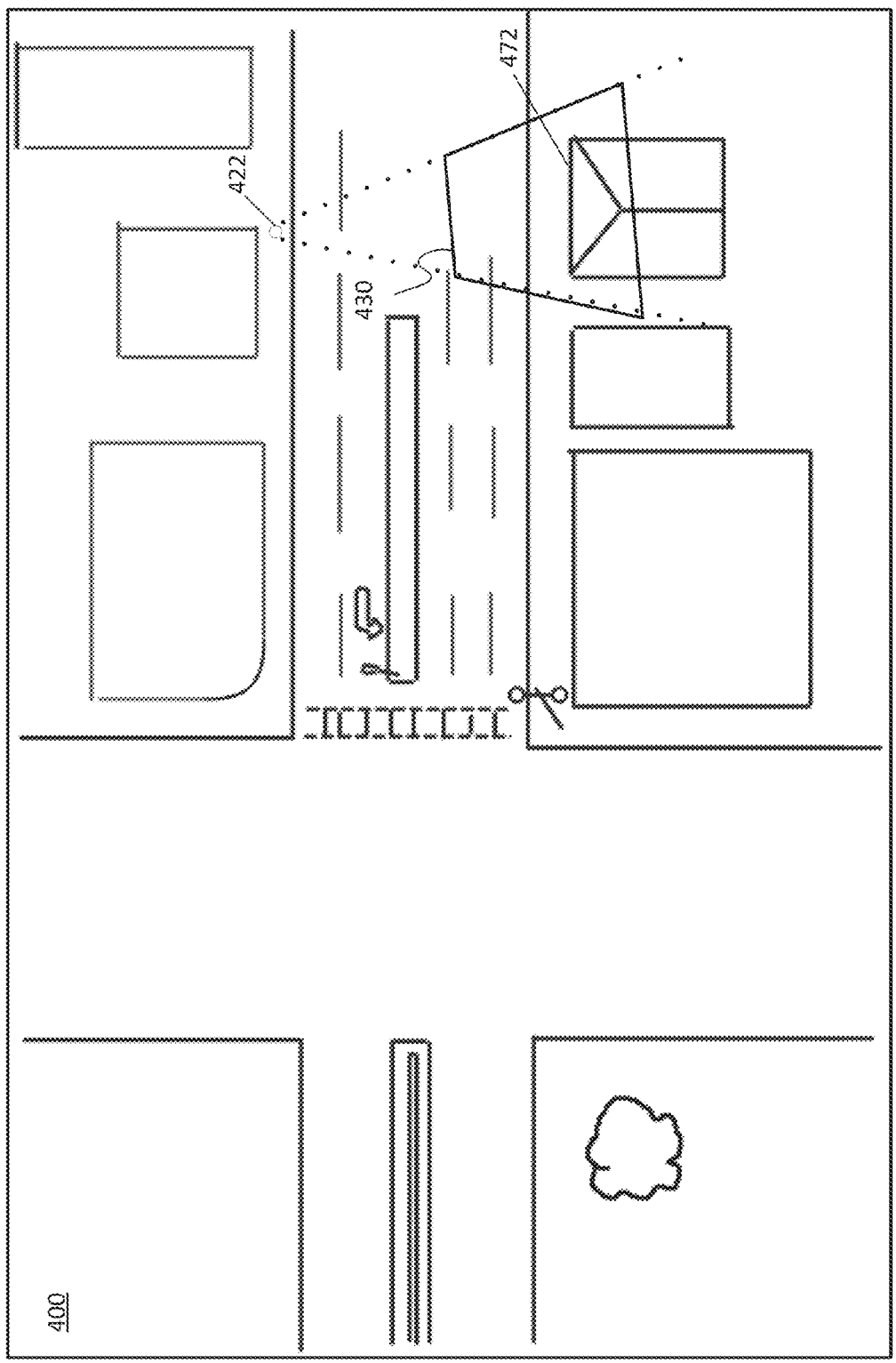
FIG. 7 illustrates another example frustum on a street setting.

FIG. 5 illustrates an example frustum 430 on a street setting 400. The locations and sizes of objects shown in the street setting 400, such as buildings and signs, may be stored in database 123. As a camera 422 moves along the street, the location of frustum 430 is calculated. Alternatively, the location of the frustum 430 is determined only when near a location of an event. At the point shown in FIG. 5, an overlap 420 exists between a building 401 and the frustum 430. If the overlap 420 exceeds a threshold amount of overlap, the camera 422 captures an image of the building 401. In one scenario, the object of interest in a façade of building 401. If the overlap threshold is, for example, 80% of the façade, then the point in time shown in FIG. 5 would not trigger an image capture, but at a later time as the camera 422 moves, as shown in FIG. 6, the frustum 430 overlaps the façade by more than the threshold, which will trigger an image capture of the façade. FIG. 7 illustrates an example where the camera 422 is carried on a person traveling on the sidewalk. The frustum 430 overlaps the building 472, which may be captured in an image by the camera if the building 472 is an object of interest.

Figure 8:
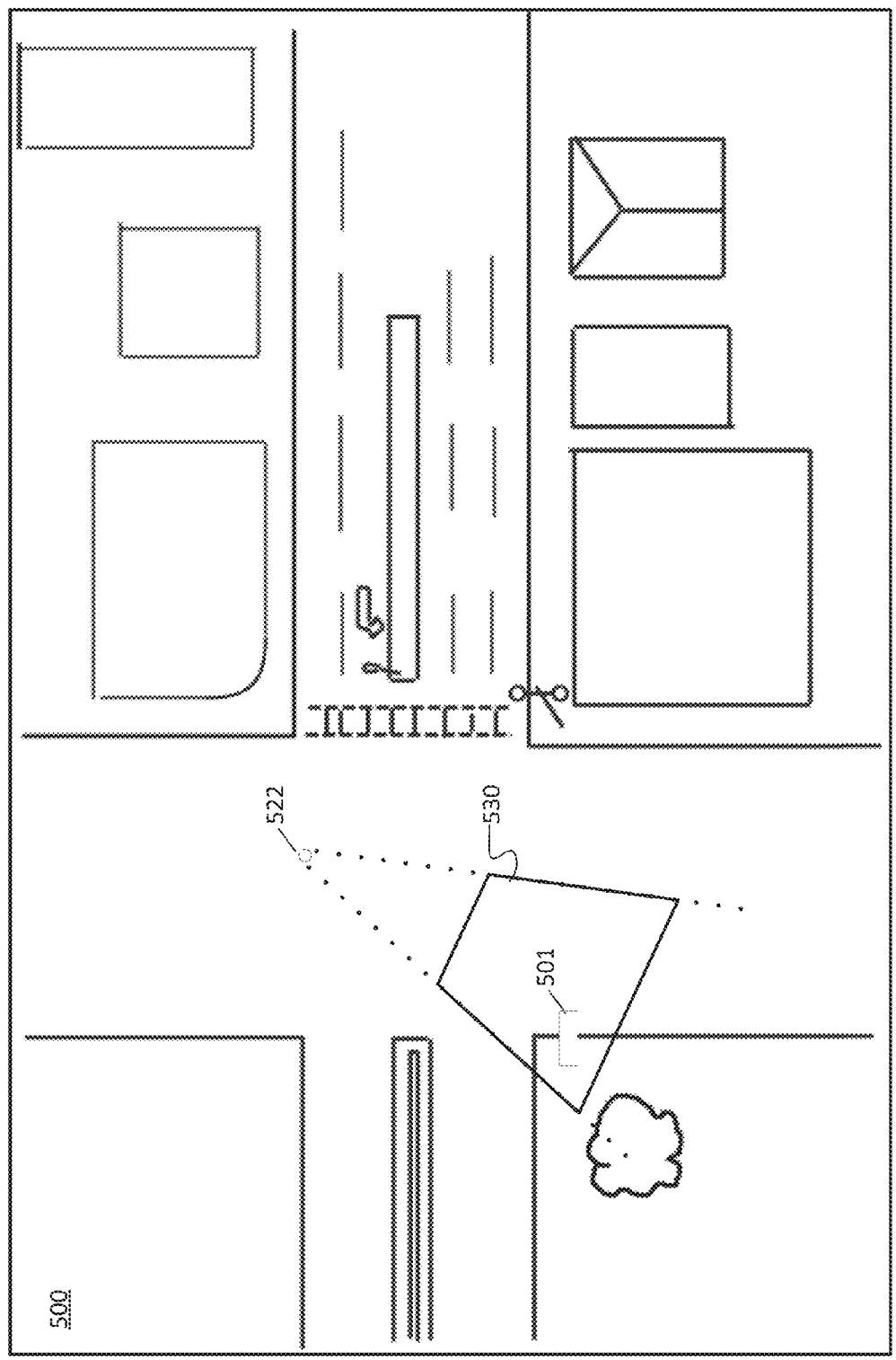
FIG. 8 illustrates another example frustum on a street setting.

FIG. 8 illustrates another example frustum 530 on a street setting 500. An imaging device 522 may be mounted in a motor vehicle that drives along a street. The imaging device 522 includes two cameras. A low resolution camera collects image data continuously. A high resolution camera collects image data when triggered. The trigger to collect an image using the high resolution camera may result from an overlap of the frustum 530 with the object of interest. Alternately, the trigger to collect an image with the high resolution camera may result from detection of a sign 501 or other writing on objects.

The low resolution camera may include a very small resolution (e.g., 480 by 640 pixels, 768 by 1024 pixels, or another resolution) and may include a low frame rate. The low resolution may be selected as optimal for storage of many images in the database 123. However, the low resolution may not be capable of reliably imaging attributes that require fine detail, such as street signs. The high resolution camera may include a relatively large resolution (e.g., 5 megapixels, 10 megapixels, or another resolution) and may include a high frame rate. The high resolution may be ideal for imaging fine detail but require more storage space.

A sign may be part of or the entire event of interest. The mobile device 122 is configured to identify when a sign is nearby. The map data stored in database 123 may include the location of signs or the likely location of signs. The mobile device 122 is configured to generate a command to capture an image with the high resolution camera when the mobile device 122 is near and/or facing a sign or when the frustum 530 overlaps a sign. Alternatively, the high resolution camera may continuously capture images but the controller may send images for storage only when the trigger is generated.

In one implementation, the mobile device 122 is configured to identify an approaching intersection of roads or segments. An estimation is made that intersections generally include signs and should be imaged. In another implementation, analysis of the images captured by the low resolution camera may be used to trigger image capture by the high resolution camera. In another example, the locations of signs may be determined from light detection and ranging (LIDAR) or other sensor data. In another alternative, a user of the mobile device may press button to trigger image capture using the high resolution camera.

The low resolution camera and the high resolution camera may also have different fields of view or different size frusta. The frustum of the low resolution camera may be larger than the frustum of the high resolution camera. Accordingly, in the example of a moving vehicle with the mobile device 122 an amount of time may exist between the time that the continuously captured low resolution images include a sign and the high resolution image frustum is in range of the sign. During this amount of time, the mobile device 122 may process the low resolution image to identify the existence of a sign.

The computing resources for automatic image capturing may be divided between the server 125 and the mobile device 122. In some embodiments, the server 125 performs a majority of the processing ("server-based embodiments"). In other embodiments, the mobile device 122 or the workstation 128 performs a majority of the processing ("endpoint-based embodiments"). In addition, the processing is divided substantially evenly between the server 125 and the mobile device 122 or workstation 128 ("hybrid embodiments"). As an example, the following initial discussion focuses on server-based embodiments.

In the server-based embodiments, the server 125 is configured to receive the geographic location from the mobile device and determine a current time. The server 125 queries the list of geospatial-temporal events to identify potential nearby events. Upon identification of a match, the server 125 may generate a command to capture and image and send the command to the mobile device 122. Alternatively, the server 125 may identify potential upcoming matches and send data of the locations of those events to the mobile device 122.

The server 125 may also be configured to coordinate crowd sourcing applications using the automatic image capture. Crowd sourcing applications allow an external system to provision data collection by the mobile device 122 and other mobile devices. In one embodiment, the server 125 generates a list of objects or events based on the crowd sourcing applications, and in another embodiment, the server 125 is configured to send commands for image capture to multiple mobile devices 122. In one example, the object of interest is a newly constructed road, building, or point of interest. The server 125 receives location information from many mobile devices and identifies the mobile devices that are near the object of interest. The nearby mobile devices are instructed to capture images when their respective frusta overlap with the object of interest, or otherwise exceed the threshold. The mobile devices return the captured images to the server 125. The higher quality images may be selected or the images may be combined into a composite image or a movie.

In another example, the server 125 may be a mobile device acting as a server. In this peer to peer scenario, the mobile device "server" instructs other mobile devices to collect images. For example, a user of the mobile device may want to know if a line has begun to form at a concert. A message is generated that is sent to other mobile device with current geographic locations near the concert. The message instructs other mobile devices to capture images, which are returned to the original mobile device.

Some additional examples of crowd sourcing or peer to peer applications collect weather images or images related to criminal activity. The server 125 may generate a list of events based on an approaching storm or other weather condition. Mobile devices in the vicinity of the weather condition and in the appropriate orientation of the direction of the weather condition are instructed to capture images of the weather condition. The images are returned to a server for inclusion on a website or distributed to other mobile device.

The list of events may be based on recent criminal activity. For example, after a crime (e.g., bank robbery, hit and run, murder) has been reported, a list of events is generated to include positions in the vicinity of the reported crime. Mobile device in the area surrounding the reported incident are instructed to capture images, which may be sent to the authorities. The mobile device 122 may display a request for permission to capture images in these examples. The images may be a series of images or video and may include audio.

In another example, automatic image capture is used to compile a photo journal of a trip. The database 123 may include points of interest along a route. The mobile device determines when the frustum overlaps the point of interest and triggers an image capture. The captured images are a photo journal of the trip. In addition, the mobile device 122 may seek out information from the Internet related to the points of interest and combine the information with the photo journal. The information may be labels in the images or subtitles.

Figure 9:
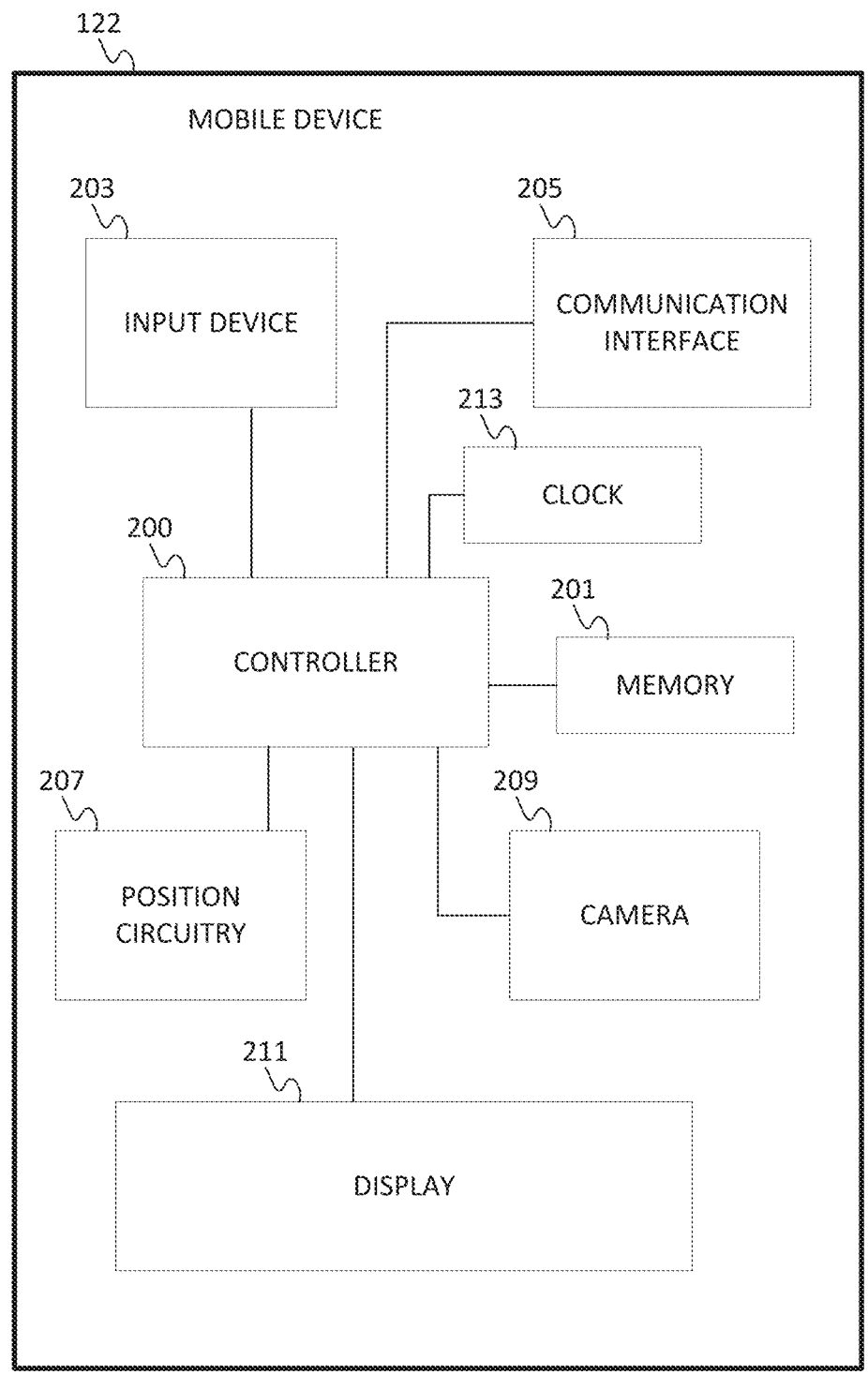
FIG. 9 illustrates an exemplary mobile device of the navigation system of FIG. 1.

FIG. 9 illustrates an exemplary mobile device 122 of the navigation system of FIG. 1. The mobile device 122 may be referred to as a navigation device. The mobile device 122 includes a controller 200, a memory 201, an input device 203, a communication interface 205, position circuitry 207, one or more cameras 209, a clock 213, and a display 211. The workstation 128 may include at least a memory and processor and may be substituted for the mobile device 122 in the following endpoint-based embodiments. In the following endpoint-based embodiments, the mobile device 122 or the workstation 128 performs a majority of the processing.

The memory 201 stores a list of events. The events may be geospatio-temporal events including a geographic component and a time component. The geographical component may include geographic coordinates (e.g., longitude, latitude) and orientation (e.g., heading). The time component may include a start time, an end time, or a time range. Example events include a new point of interest, which may have a start time only, a parade, which may have a time range, and a weather condition, which may have an end time only.

The positioning circuitry, which is an example of a positioning system, is configured to determine a geographic position of the mobile device 122. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The controller 200 is configured to compare the geographic position of the mobile device 122 and a current time to the geospatio-temporal events. The comparison may include a determination whether the mobile device 122 is within a range of the geographic coordinates specified in the geospatio-temporal events or will be in the range. The controller 200 is also configured to generate an instruction to capture an image when the geographic position and the current time intersect one of the geospatio-temporal events, such as applying an analysis of the frustum of the camera.

In order to facilitate efficient processing of the comparison at the mobile device 122, the mobile device 122 may receive only portions of the list of events. For example, the mobile device 122 may send a current location to the server 125. The server 125 may generate a list of events within a predetermined distance of the current location. The predetermined distance may be 1 mile, 10 miles, 100 meters, or another distance. The predetermined distance may vary dependent on the current speed of the mobile device 122, which is determined by the position circuitry.

The camera 209 may be windshield mounted, dashboard mounted, or externally mounted to a motor vehicle or other vehicle. The camera 209 may be statically or rotatably mounted. A rotatably mounted camera has a variable frustum with respect to the vehicle. The camera 209 may be automatically or manually zoomed, panned, titled, or rotated to capture details of interest. The camera may be mounted on a side of the motor vehicle such that the field of view of the camera 209 is perpendicular or at an acute angle with the direction of travel of the vehicle. The camera 209 may be on a cellular phone or mounted on a person. The camera 209 may include a low resolution camera and a high resolution camera. The camera 209 may include an omnidirectional camera. The camera 209 may include a LIDAR sensor. The LIDAR sensor may be triggered to acquire laser scan data when the LIDAR sensor is in range of the object of interest.

The input device 203 may be one or more buttons, keypad, keyboard, mouse, stylist pen, trackball, rocker switch, touch pad, voice recognition circuit, or other device or component for inputting data to the mobile device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

Figure 10:
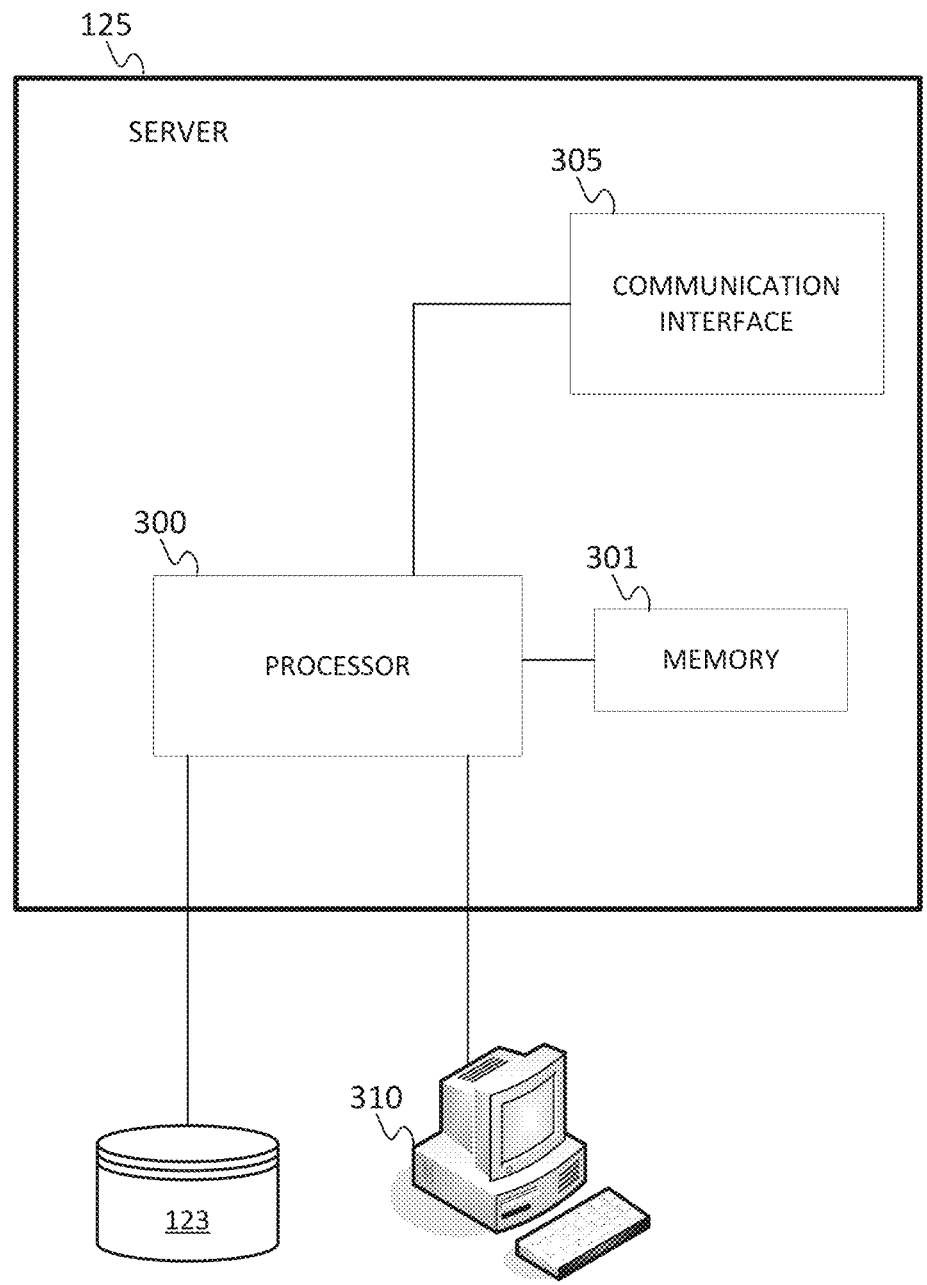
FIG. 10 illustrates an exemplary server of the navigation system of FIG. 1.

FIG. 10 illustrates an exemplary server 125 of the navigation system of FIG. 1. The server 125 includes a processor 300, a communication interface 305, and a memory 301. The server 125 may be coupled to a database 123 and a workstation 310. The database 123 may be a geographic database as discussed above. The workstation 310 may be used as an input device for the server 125. In addition, the communication interface 305 is an input device for the server 125. The communication interface 305 receives data indicative of use inputs made via the workstation 128 or the mobile device 122.

The processor 300 may generate the list of events and send the list of events to the mobile device. Alternately, a majority of the processing may take place on the server 125. For example, the mobile device 122 may send location and orientation data (e.g., data indicative of the location of the frustum) to the communication interface 305. The list of events may be stored at memory 301 or database 123. The processor 300 is configured to compare the location and orientation data to the list of events and generate a command to capture an image when there is an overlap with the list of events based on the current position of the mobile device 122. The communication interface 305 sends the command to capture an image to the mobile device 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 201 and/or memory 301 may be a volatile memory or a non-volatile memory. The memory 201 and/or memory 301 may include one or more of a read only memory (ROM), random access memory (RAM), a flash memory, an electronic erasable program read only memory (EEPROM), or other type of memory. The memory 201 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

Figure 11:
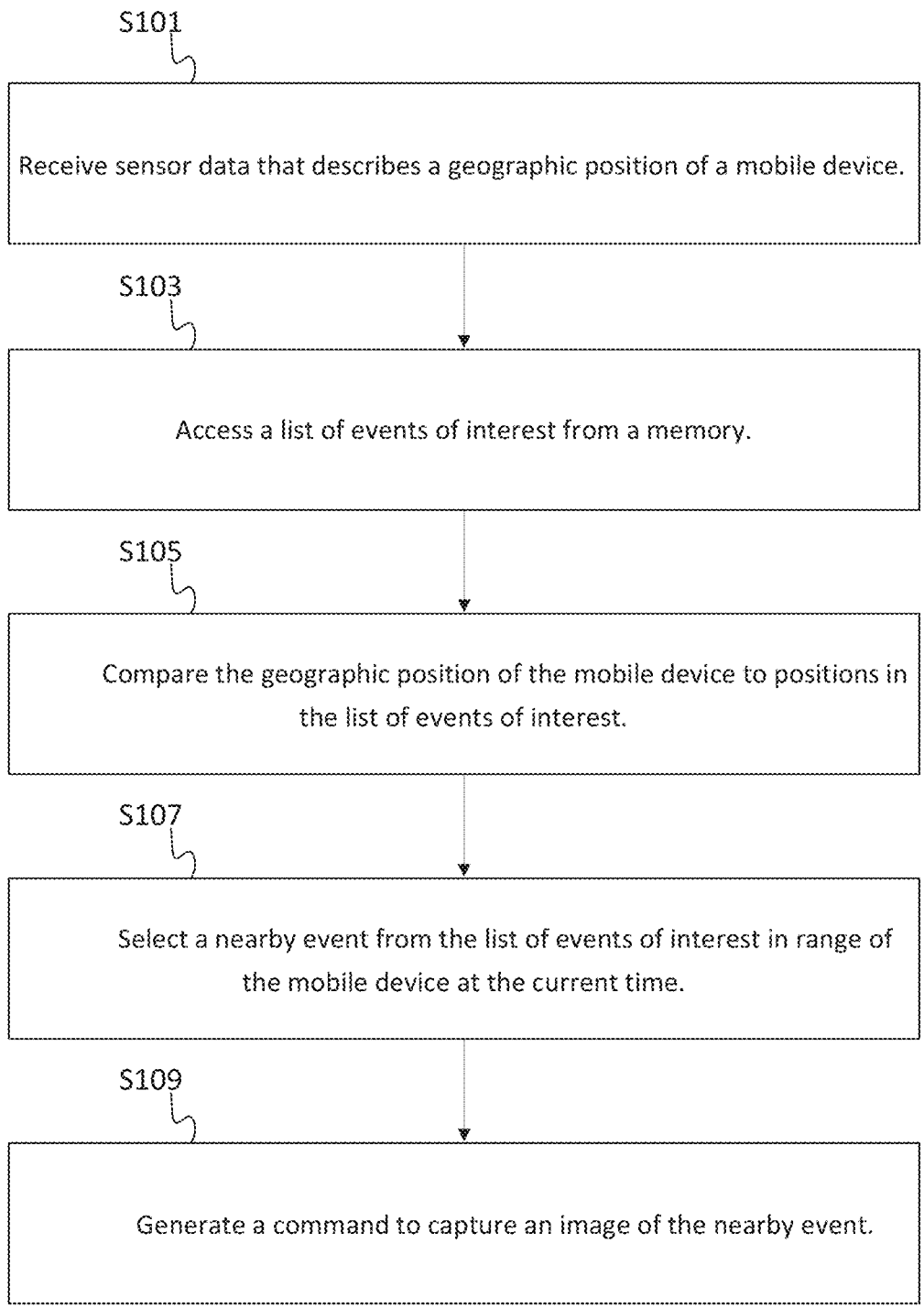
FIG. 11 illustrates an example flowchart for automatic image capture.

FIG. 11 illustrates an example flowchart for automatic image capture. As presented in the following sections, the term controller may refer to either controller 200 or processor 300 and the following acts may be performed by mobile device 122, server 125, or a combination thereof. Additional, different, or fewer acts may be provided. The acts are performed in the order shown or other orders.

At act S101, the controller receives sensor data that describe a geographic position of a mobile device. In the case of server 125, the controller may receive sensor data from multiple mobile devices. The sensor data may include any combination of GPS data, accelerometer data, and magnetic sensor data. The sensor data may specifically describe a current field of view of the mobile device. The sensor data may include multiple three-dimensional or two-dimensional coordinate that define a frustum of the mobile device. Alternatively, the current field of view is not considered, and random opportunity is used to capture images. Subsequent image processing determines whether the field of view actually included the object of interest.

At act S103, the controller accesses a list of events from memory. The list of events includes position data and time data. The position data may be a single point representative of the location of the event or object. The position data may be a point, an area or a volume of the event or object. The time data may be a point in time or a time range. For example, for a new building or point of interest, the time data may be a point when the new building or point of interest is scheduled for completion. When the event is weather, traffic, or a concert, the time data may include a start time and an end time. Additionally, events may include time ranges with a start time of sunrise and an end time of sunset so that captured images are collected in daylight. Alternatively, business hours or other limits may define the time range.

This list of events may be generated to collect images to provide updates to a map database in combination with other functions. For example, the images may be collected to determine how crowded a function or a location is. One user sends out a request and the mobile devices of other users at the function collect images that depict the crowd. Similarly, vehicles already stuck in traffic may capture images indicative of the traffic, which are distributed to other users before they reach the congestion.

At act S105, the controller compares the geographic position of the mobile devices to the positions of the list of events. The controller also access a current time and compares the current time to the times in the list of events. At act S107, if there is a match, the controller selects a nearby event from the list events of interest in range of the mobile device at the current time. Whether or not the nearby event is in range of the mobile device may depend on a threshold. The threshold is an amount of overlap that the current field of view must overlap the nearby event to be considered a match. At act S109, the controller generates a command to capture an image of the nearby event. The command is sent to a camera, which captures an image or a series of images, which are stored in memory.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   receiving sensor data configured to describe a geographic position of a mobile device;
   accessing a list of events of interest from a memory;
   calculating, by a processor, a frustum for a view of the mobile device, wherein the frustum spans a geographic area;
   comparing, by the processor, an overlap of the frustum and the geographic position to a threshold level of overlap for positions in the list of events of interest;
   comparing, by the processor, a current time to time data in the list of events of interest;
   selecting an event from the list of events of interest in range of the mobile device at the current time; and
   generating a command to capture an image of the selected event.

2. The method of claim 1, further comprising:
   storing the image of the selected event in the memory of the mobile device; and
   sending the image of the selected event to a server.

3. The method of claim 1, wherein the geographic area overlaps at least a portion of a geographic position of the selected event.

4. The method of claim 1, wherein the frustum is defined by at least three points in a three-dimensional space.

5. The method of claim 1, wherein the sensor data is configured to describe an orientation of the mobile device.

6. The method of claim 1, further comprising:
generating the list of events of interest from locations and time in a social networking service or a calendar.

7. The method of claim 1, wherein the list of events of interest includes a building construction, and the captured image is used to add the building construction to a database.

8. The method of claim 1, further comprising:
generating the list of events of interest based on a weather report or a weather condition.

9. The method of claim 1, further comprising:
generating the list of events from a social networking service, a calendar, or a weather report.

10. An apparatus comprising:
a memory including data indicative of a geospatio-temporal event;
a positioning system configured to determine a geographic position of the apparatus; and
a controller configured to compare the geographic position of the apparatus and a current time to the geospatio-temporal event and configured to generate an instruction to capture an image when the geographic position and the current time intersect with the geospatio-temporal event,
wherein the controller is configured to determine whether the geographic position intersects the geospatio-temporal event based on a comparison of an overlap percentage of a frustum describing a field of view of a camera and a predetermined threshold level of overlap.

11. The apparatus of claim 10, wherein the positioning system is configured to generate sensor data and includes at least one of an accelerometer and a magnetic sensor.

12. The apparatus of claim 10, wherein the geospatio-temporal event is selected by an external system to provision data collection by the apparatus.

13. The apparatus of claim 10, wherein a plurality of geospatio-temporal events include a list of points of interest along a route and generated based on calculation of the route.

14. The apparatus of claim 10, wherein a plurality of geospatio-temporal events include events based on traffic conditions or criminal activity.

15. The apparatus of claim 10, further comprising:
the camera configured to capture the image based on the instruction to capture the image; and
a display configured to prompt the user to accept the instruction to capture the image.

16. A non-transitory computer readable medium including instructions that when executed are operable to:
receive sensor data configured to describe a geographic position of a mobile device;
access a list of objects of interest and positions from a memory;
compare the geographic position of the mobile device to the positions in the list of objects of interest based on a comparison of an overlap frustum describing a field of view of view of a camera of the mobile device to a threshold level of overlap;
select a nearby object from the list of objects of interest in range of the mobile device; and
generate a command to capture an image of the nearby object.

17. The non-transitory computer readable medium of claim 16, the instruction operable to:
capture a low resolution image of the nearby object before the command is generated; and
capture a high resolution image of the nearby object is response to the command to capture the image of the nearby object.

18. A method comprising:
receiving sensor data configured to describe a geographic position of a mobile device;
accessing a list of events of interest from a memory;
calculating, by a processor, a frustum for a view of the mobile device, wherein the frustum spans a geographic area;
comparing, by the processor, an overlap of the frustum and the geographic position to a threshold level of overlap;
comparing the geographic position of the mobile device to positions in the list of events of interest;
comparing, by the processor, a current time to time data in the list of events of interest;
selecting an event from the list of events of interest in range of the mobile device at the current time; and
generating a command to capture an image of the selected event.

19. An apparatus comprising:
at least one processor; and
at least one memory including computer program code;
the at least one memory and the computer program code configured to, with the at least one processor, cause the apparatus at least to perform:
receiving sensor data configured to describe a geographic position of a mobile device;
accessing a list of events of interest from a memory;
calculating, by a processor, a frustum for a view of the mobile device, wherein the frustum spans a geographic area;
comparing, by the processor, an overlap of the frustum and the geographic position to a threshold level of overlap for positions in the list of events of interest;
comparing, by the processor, a current time to time data in the list of events of interest;
selecting an event from the list of events of interest in range of the mobile device at the current time; and
generating a command to capture an image of the selected event.

20. A method comprising:
receiving sensor data configured to describe a geographic position of a mobile device;
accessing a list of events of interest from a memory;
calculating, by a processor, a frustum for a view of the mobile device, wherein the frustum spans a geographic area;
performing, by the processor, a comparison of an overlap of the frustum and the geographic position to a threshold level of overlap for positions in the list of events of interest;
selecting an event from the list of events of interest in range of the mobile device based on the comparison; and
generating a command to capture an image of the selected event.

* * * * *